United States Patent
Fields, Jr. et al.

(10) Patent No.: US 6,493,814 B2
(45) Date of Patent: Dec. 10, 2002

(54) REDUCING RESOURCE COLLISIONS ASSOCIATED WITH MEMORY UNITS IN A MULTI-LEVEL HIERARCHY MEMORY SYSTEM

(75) Inventors: James Stephen Fields, Jr., Austin, TX (US); Jody Bern Joyner, Austin, TX (US); William John Starke, Round Rock, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 09/801,610

(22) Filed: Mar. 8, 2001

(65) Prior Publication Data

US 2002/0129220 A1 Sep. 12, 2002

(51) Int. Cl.⁷ .............................................. G06F 12/00
(52) U.S. Cl. ................. 711/216; 711/117; 711/118; 711/122; 711/220
(58) Field of Search ............................. 711/117, 118, 711/122, 216, 220

(56) References Cited

U.S. PATENT DOCUMENTS

| | | | | |
|---|---|---|---|---|
| 5,179,680 A | * | 1/1993 | Colwell et al. | 711/125 |
| 5,329,629 A | * | 7/1994 | Horst et al. | 365/238.5 |
| 6,070,227 A | * | 5/2000 | Rokicki | 711/111 |
| 6,108,745 A | * | 8/2000 | Gupta et al. | 711/127 |
| 6,128,723 A | | 10/2000 | Nguyen et al. | 712/23 |
| 6,045,286 A1 | * | 6/2002 | Gupta et al. | 711/127 |

* cited by examiner

*Primary Examiner*—Than Nguyen
(74) *Attorney, Agent, or Firm*—Robert A. Voight, Jr.; Winstead Sechrest & Minick P.C.; Casimer K. Salys (57) ABSTRACT

A system and method for reducing resource collisions associated with memory units. Resource collisions may be reduced in part by a hash that combines the number N bits in the bank selector field with the number M bits adjacent to a region of correlation, e.g., row selector field, in an address to determine which bank in a memory unit, e.g., cache, may store the information associated with the address.

30 Claims, 3 Drawing Sheets

FIG. 1

REDUCING RESOURCE COLLISIONS ASSOCIATED WITH MEMORY UNITS IN A MULTI-LEVEL HIERARCHY MEMORY SYSTEM

TECHNICAL FIELD

The present invention relates to the field of multi-level hierarchy memory systems, and more particularly to reducing resource collisions associated with memory units, e.g., cache memories, in a multi-level hierarchy memory system.

BACKGROUND INFORMATION

A conventional processing system may employ a multi-level hierarchy memory system. A multi-level memory processing system may comprise a processor having various execution units and registers, as well as branch and dispatch units which forward instructions to appropriate execution units. The processor may further comprise a level one (L1) instruction cache and a level one (L1) data cache. It is noted that those skilled in the art will recognize that a single, unified L1 cache may be implemented. The L1 instruction cache and L1 data cache may be configured to temporarily store instruction and data values, respectively, that may be repeatedly accessed by the processor. By storing instruction and data values that are repeatedly accessed, processing speed may be improved by avoiding the step of loading the values from the system memory, e.g., Random Access Memory (RAM). In order to minimize data access latency, one or more additional levels of cache memory may be implemented within the processing system, such as a level two (L2) cache and a level three (L3) cache. The lower cache levels, e.g., L2, L3, may be employed to stage data to the L1 cache and typically have progressively larger storage capacities but longer access latencies.

Typically, a cache may be organized as a collection of spatially mapped, fixed size storage region pools commonly referred to as "rows." Each of these storage region pools typically comprise one or more storage regions of fixed granularity. These storage regions may be freely associated with any equally granular storage region in the system as long as the storage region spacially maps to the row containing the storage region pool. The position of the storage region within the pool may be referred to as the "column." The intersection of each row and column contains a cache line. The size of the storage granule may be referred to as the "cache line size." A unique tag may be derived from an address of a given storage granule to indicate its residency in a given row/column position.

A particular cache line within a cache may be accessed by using the following addressing scheme. A subset of the full number of address bits commonly referred to as a row selector may be used to form an index into the cache, which uniquely identifies a row within the cache. The remaining set of address bits commonly referred to as an address tag may be used to select a particular column within the cache thereby defining a physical address for the cache line. It is noted that a cache may also be represented by one or more banks where each bank may be indexed by bits within the row selector bits commonly referred to as bank selector bits. Typically, bank selector bits are the bottom bits in the row selector bits.

When a request accesses a cache structure, the address referenced by the request is mapped to determined which row in the cache is allowed to maintain the referenced granule. The tag is then derived and compared with the tag associated with each freely associative region (or column position) within the row. If a match is found, the matching column position may include a valid copy of the memory granule and the requested operation may be permitted to be carried out at this cache. This is commonly referred to as a "cache hit." Otherwise, a "cache miss" is said to have occurred. In the case of a cache miss, one or more requests may typically be spawned to other memory structures, e.g., caches, in the storage hierarchy to carry out the request for information.

The amount of concurrent request traffic through the multi-level hieararchy memory system tends to increase due to the increase in speculative instruction execution, the increase in the usage of prefetching mechanisms, and the tendency of a single operation, e.g., request, at a given level in the hierarchy to spawn multiple operations, e.g., requests, to the next level of the hieararchy such as in a cache miss.

General caching theory postulates that an ensuing temporally correlated request, i.e., a request arriving soon after a previous request, to access a granule of memory from the same requester may be spatially correlated such that it may be likely to map to a memory granule that is spatially proximate to the memory granule accessed by the previous request.

For this reason, caches are typically organized such that spatially proximate memory granules map to different rows to minimize the over utilization of any given row. Likewise, they are typically organized such that spatially proximate memory granules map to different banks to increase the likelihood that concurrent requests do not result in resource collisions.

For example, a processing system may have a contiguous memory of 1 gigabyte. A given memory unit in the multi-level memory hierarchy system may have a cache structure capable of retaining 2 megabytes. The cache structure may be organized into 1024 rows where each row may comprise 16 freely associative storage regions (or lines) where each storage region may comprise a 128-byte granule of memory, i.e., 128-byte line-size. The byte capacity of the cache may thus be calculated by multiplying the number of rows, the number of columns and the line size of the cache which equals 2 megabytes.

As stated above, in the case of a cache miss, one or more requests may typically be spawned to other memory levels in the multi-level memory hierarchy to carry out the requested operation. More specifically, in the case of a cache miss, a fetch request may be spawned to the next level of the cache hierarchy. The purpose of the fetch is to retrieve the memory granule, i.e., requested information, that was not found at the current cache. In most cases the requested memory granule may be installed, i.e., reloaded, into the cache structure at the current cache.

When the memory granule is installed into the current cache structure, it may displace another memory granule (called the "victim") currently residing in the same row. Once a victim is selected, the status of the victim may typically be assessed. Typically, the victim is selected by a hash which attempts to choose the least recently used granule since it has the lowest temporal correlation. Normally, if the victim has been locally modified, i.e., it is the only valid copy of the memory granule in the system, it must be preserved. The operation used to insure the preservation of the victim may commonly be referred to as a castout. A castout operation spawns a write request to the next level of the cache hierarchy. The purpose of the write request is to safely place the victim memory granule into the cache structure at the next level of the hierarchy.

The above two operations, e.g., fetch and castout operations, are specific examples of operations that may be temporally correlated in that they tend to be issued almost simultaneously. The fetch and castout operations are spatially correlated in that the memory granules they reference map to the same row in the cache from which they are initiated. It is noted that other operations may be temporally correlated such as fetch operations or castout operations or invalidate/kill operations or any combination thereof that occur almost simultaneously.

Referring to the fetch and castout operation example, when the fetch and castout operations arrive at cache (call it cache Y) in the next level of the cache hierarchy their temporal and spatial correlation to each other change the level of collision risk they introduce at cache Y. Since the row selection bits in the address associated with the modified information in the victim in cache X are the same as the row selection bits in the address associated with the requested information in cache Y, the bank selection bits in the address associated with the modified information in cache X must equal the bank selection bits in the address associated with the requested information in cache Y. This introduces the unfortunate property that fetches and associated castouts spawned at cache X and serviced at cache Y have a 100% likelihood of colliding upon the same bank in cache Y commonly referred to as a resource collision. That is, the information requested in the fetch request issued by cache X is stored in the same bank as the bank in cache Y that will store the modified information sent by cache X in the castout request.

A resource collision may also occur when fetch operations or castout operations or invalidate/kill operations or any combination thereof occur almost simultaneously. The probability of resource collisions when there does not exist spatial correlation is 1/N where N is the number of banks in the cache. The probability of resource collisions may be increased based upon the spatial correlation between the operations. Therefore, there exists a general problem of resource collision in hierarchial memories based upon spatial and temporal proximity.

It would therefore be desirable to develop a hash that reduces resource collisions associated with memory units, e.g., caches, in a multi-level heirarchy memory system.

SUMMARY

The problems outlined above may at least in part be solved in some embodiments by a hash that combines the number N bits in the bank selector field with the number M bits adjacent to the row selector field in an address to determine which bank may store the information associated with the address.

In one embodiment of the present invention, a method for reducing resource collisions associated with address flows through hierarchial memory units comprises the step of receiving a first operation, e.g., fetch request, by a first memory unit where the first operation is a first request to access information identified by a first address. The first memory unit may be configured to determine a particular entry, e.g., cache line, to store the information requested that may be retrieved by a lower level memory unit if the information requested was not present within the first memory unit. If the information in the particular entry, e.g., cache line, selected by the first memory unit to store the requested information has been modified, then the first memory unit may issue a second operation, e.g., castout request, to a lower memory level, a second memory unit, to store the modified information associated with a second address in a first bank in the second memory unit. The first bank in the second memory unit that may store the modified information to be sent from the first memory unit may be determined by implementing a hash that combines the number N bits in the bank selector field with the number M bits adjacent to a region of correlation, e.g., row selector field, in the second address associated with the modified information. Furthermore, the first memory unit may issue a third operation, e.g., fetch request, to the lower memory level, the second memory unit, almost concurrently with the second operation if the information requested was not present within the first memory unit. The third operation memory unit may request to access the information identified by the first address. The information requested in the third operation may be identified in a second bank in the second memory unit by implementing the same hash that combines the number N bits in the bank selector field with the number M bits adjacent to the region of interest, e.g., row selector field, in the first address associated with the information requested. Upon identifying the requested information, the second memory unit may write back or reload the requested information to the particular entry in the first memory unit selected to store the requested information. If the value of the second number M bits in the first address differs from the value of the second number M bits in the second address, then the first bank and the second bank differ.

In another embodiment of the present invention, the hash may combine the N number bits in the bank selector field with the M number bits adjacent to a region of correlation, e.g., row selector field, using an XOR function. In another embodiment of the present invention, the hash may combine the number N bits in the bank selector field with the number M bits adjacent to a region of correlation, e.g., row selector field, by adding the number N bits in the bank selector field with the number M bits adjacent to the region of interest, e.g., row selector field, and discarding the carry bit.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
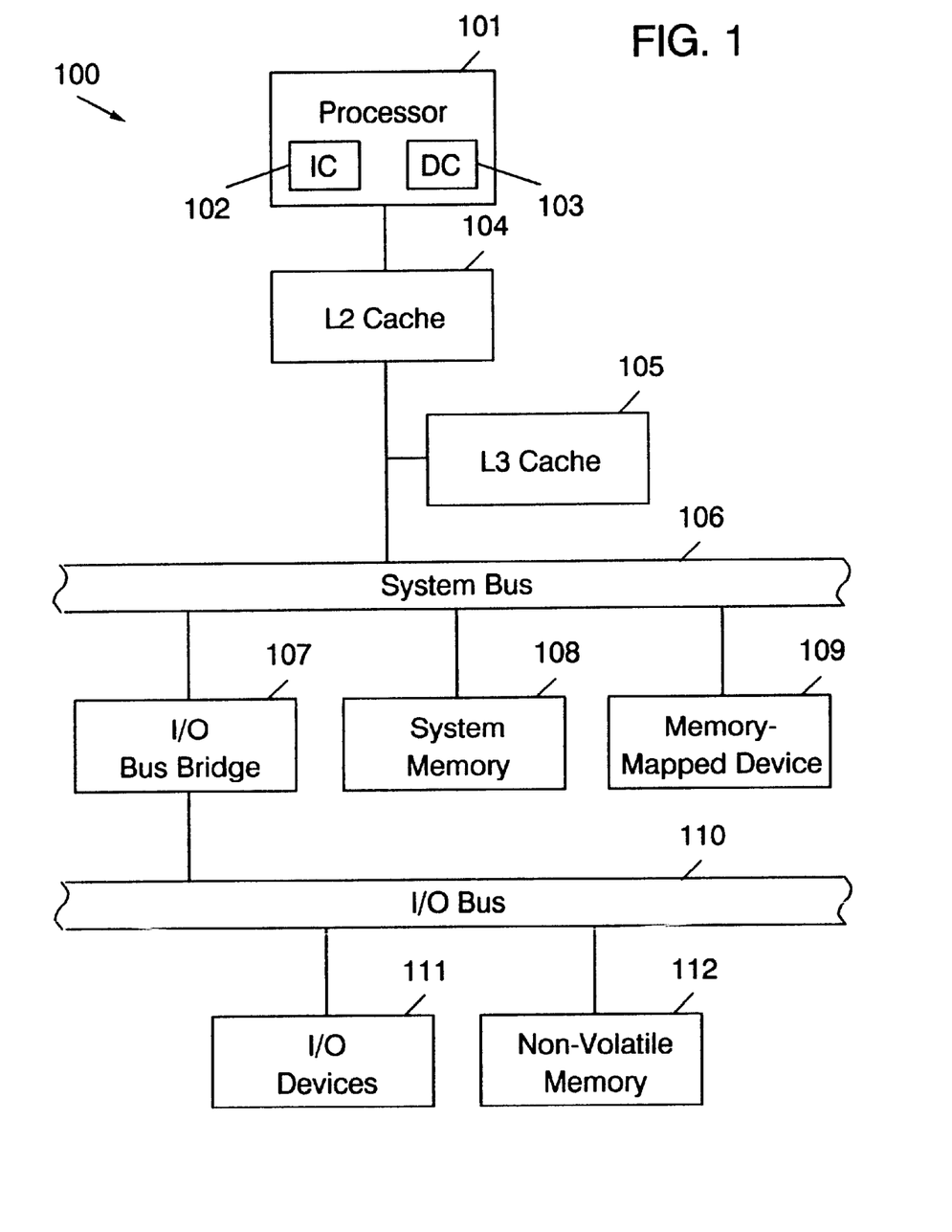
FIG. 1 illustrates a data processing system configured in accordance with the present invention.

FIG. 1—Computer System

FIG. 1 illustrates an embodiment of the present invention of a data processing system 100. Data processing system 100 comprises a processing unit 101, such as a conventional microprocessor. Processor 101 may comprise a level one (L1) instruction cache 102 and a level one (L1) data cache 103. It is noted that those skilled in the art will recognize that a single, unified L1 cache may be implemented. L1 instruction cache 102 and L1 data cache 103 may be configured to temporarily store instruction and data values, respectively, that may be repeatedly accessed by processor 101. By storing instruction and data values that are repeatedly accessed, processing speed may be improved by avoiding the step of loading the values from a system memory 108, e.g., Random Access Memory (RAM). In order to minimize data access latency, one or more additional levels of cache memory may be implemented within data processing system 100, such as a level two (L2) cache 104 and a level three (L3) cache 105. The lower cache levels, e.g., L2 cache 104, L3 cache 105, are employed to stage data to the L1 caches, e.g., L1 cache 102, and typically have progressively larger storage capacities but longer access latencies. It is noted that data processing system 100 may comprise any number of levels of memory, i.e., any number of levels of cache, and that FIG. 1 is illustrative.

For example, L1 instruction cache 102 and L1 data cache 103 may each have a storage capacity of 32 KB (kilobytes) and an access latency of approximately 1–2 processor cycles. L2 cache 104 may have a storage capacity of 512 KB but an access latency of 5 processor cycles, while L3 cache 105 may have a storage capacity of 4 MB but an access latency of greater than 15 processor cycles. L2 cache 104 and L3 cache 105 thus serve as intermediate storage between processor 101 and system memory 108, which typically has a much larger storage capacity but may have an access latency of greater than 50 processor cycles.

Referring to FIG. 1, L2 cache 104 and L3 cache 105 are connected to system memory 108 via a system bus 106. Also connected to system bus 106 may be a memory mapped device 109, e.g., graphics adapter providing a connection for a display (not shown), and an input/output (I/O) bus bridge 107. I/O bus bridge 107 may further be coupled to an I/O bus 110, which may provide connections for I/O devices 111 and a nonvolatile memory 112. System bus 106, I/O bus bridge 107 and I/O bus 110 thus form an interconnect coupling the attached devices, for which alternative implementations are known in the art. I/O devices 111 may comprise conventional peripheral devices such as a keyboard, a graphical pointing device, e.g., mouse, trackball, a display and a printer, which are interfaced to I/O bus 110 via conventional adapters. Non-volatile memory 112 may comprise a hard disk drive and store an operating system and other software controlling operation of system 100, which are loaded into volatile system memory 108 in response to system 100 being powered on. Those skilled in the art will recognize that data processing system 100 may include many additional components not shown in FIG. 1, such as serial and parallel ports, connections to networks or attached devices, a memory controller regulating access to system memory 108, etc. Such modifications and variations are within the spirit and scope of the present invention.

Figure 2:
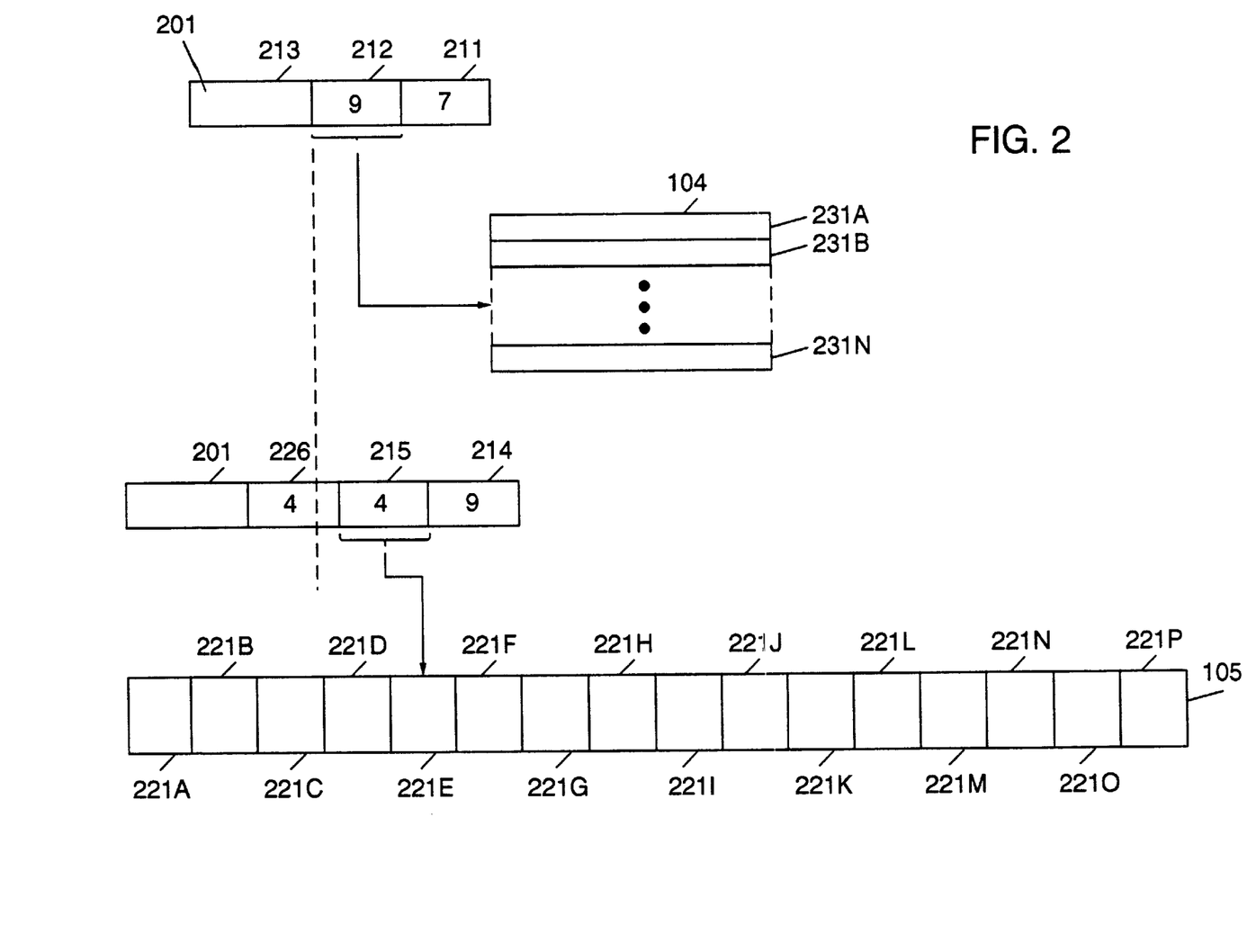
FIG. 2 illustrates an embodiment of the present invention of an L2 and a L3 cache.

FIG. 2—L2 and L3 Cache

FIG. 2 illustrates an embodiment of the present invention of L2 cache 104 and L3 cache 105 in a store-in cache implementation. L2 cache 104 may comprise a plurality of rows, e.g., row 231A, 231B, . . . 231N, where N is the 512$^{th}$ row. Rows 231A–N may collectively or individually be referred to as rows 231 or row 231, respectively. It is noted that L2 cache 104 may comprise any numbers of rows and that FIG. 2 is illustrative. L3 cache 105 may comprise a plurality of banks 221A–221P. Banks 221A–221P may collectively or individually be referred to as banks 221 or bank 221, respectively. It is noted that L3 cache 105 may comprise any number of banks and that FIG. 2 is illustrative.

Referring to FIG. 2, L2 cache 104 and L3 cache 105 may be accessed by certain bits in an address 201. The following describes which particular bits in address 201 may be used to access a particular row 231 in L2 cache 104 or a particular bank 221 in L3 cache 105.

A particular row 231 in L2 cache 104 may be accessed from bits commonly referred to as a row selector in field 212 in address 201. Since there are 512 rows in the exemplary embodiment of L2 cache 104, field 212 of address 201 may comprise 9 bits to select a particular row of L2 cache 104. Address 201 may further comprise a field 211 that provides a finer degree of resolution to identify a particular byte within the cache line. In the exemplary embodiment of L2 cache 104, the number of bytes in a cache line may be 128 bytes commonly referred to as the cache line size. Since the cache line size is 128 bytes, the number of bits in field 211 of address 201 is 7. The remaining set of address bits of address 201 is commonly referred to as an address tag in field 213 that may be used to select a particular column within L2 cache 104 thereby defining a physical address for a cache line.

Referring to FIG. 2, a particular bank 221 may be accessed from bits commonly referred to as a bank selector in field 215 in address 201. It is noted for clarity that the bits within field 215 are within field 212. That is, the bits that define the bank selector are bits that form part of the bits that define the row selector in field 212. Since there are 16 banks 221 in the exemplary embodiment of L3 cache 105, bank selector in field 215 of address 201 may comprise 4 bits. As stated above, those 4 bits are also those bits that form part of the row selector in field 212 as described above. Since the bank selector in field 215 may be defined by bits that also define row selector in field 212, a resource collision may occur as described in the Background Information section. Address 201 may further comprise an additional field 214 that provides a finer degree of resolution to select a particular byte in a bank. In the exemplary embodiment of L3 cache 105, the number of bytes in each bank 221 may be 512 bytes commonly referred to as the bank size. Since the bank size is 512 bytes, the number of bits in field 214 of address 201 is 9.

As stated in the Background Information section, a resource collision may occur when fetch operations or castout operations or invalidate/kill operations or any combination thereof occur almost simultaneously. The probability of resource collisions when there does not exist spatial correlation is 1/N where N is the number of banks in the cache. The probability of resource collisions may be increased based upon the spatial correlation between the operations. Therefore, there exists a general problem of resource collision in hierarchial memories based upon spatial and temporal proximity. For example, a resource collision may occur when a first entry in a first particular memory unit, e.g., victim line in L2 cache 104, to receive the requested information is occupied with the modified information as well as the fact that a second entry in a second particular memory unit, e.g., a particular bank 221 in L3 cache 105, to receive the modified information from the first particular memory unit, e.g., L2 cache 104, is occupied with the requested information to be sent to the first entry in the first particular memory unit, e.g., victim line in L2 cache 104. In another example, a resource collision may occur when two or more castout operations occur almost simultaneously thereby attempting to store the modified information from each respective victim line in the same bank, e.g., bank 221, in a particular memory unit, e.g., L3 cache 105. In another example, a resource collision may occur when two or more fetch operations occur almost simultaneously thereby attempting to retrieve the information requested in each fetch operation from the same bank, e.g., bank 221, in a particular memory unit, e.g., L3 cache 105. The following discusses the present invention in connection with a resource collision occurring when at least one fetch operation and at least one castout operation occur almost simultaneously.

However, it is noted that even though the following discusses the present invention in connection with a resource collision occurring when at least one fetch and at least one castout operation occur simultaneously the present invention may also be implemented to at least in part solve a resource collision when any spatial or temporal conflicts occur in a hierarchial memory system. It is further noted that even though the following discusses the present invention in connection with conveying information down the hierarchy of a memory system that the present invention may be implemented in connection with conveying information up the hierarchy of a memory system.

Resource collisions may at least in part be solved in some embodiments by implementing a hash that combines the number N bits of the bank selector in field 215 with the number M bits in address 201 to determine which bank 221 in the next lower level cache, e.g., L3 cache 105, may store the information associated with the address. In one embodiment, the number N bits defining the bank selector in field 215 in address 201 may be combined with the number M bits in field 226 located adjacent to a region of correlation, e.g., field 212. In one embodiment, the number N bits of the bank selector in field 215 is four and the number M bits in field 226 is four as illustrated in FIG. 2. It is noted that numbers N and M may be any number of bits and that FIG. 2 is illustrative.

By implementing the above stated hash when both the number N bits and the number M bits are four, there is a 15 out of 16 probability that the modified information will be stored in a different bank 221 in the next lower level cache, e.g., L3 cache 105, than the bank 221 in the next lower level cache, e.g., L3 cache 105, storing the requested information to be written to the next higher level cache, e.g., L2 cache 104, as explained below. If the four bits in field 226 in address 201 associated with the requested information to be written to the next higher level cache, e.g., L2 cache 104, is different from the four bits in field 226 in address 201 associated with the modified information, then the modified information is stored in a different bank 221 in the next lower level cache, e.g., L3 cache 105, then the bank 221 storing the requested information to be written to the next higher level cache, e.g., L2 cache 104. There is a 15 out of 16 probability that those four bits in field 226 in address 201 associated with the requested information to be written to the next higher level cache, e.g., L2 cache 104, may be different from the four bits in field 226 in address 201 associated with the modified information. Therefore, there is a 15 out of 16 probability that the modified information will be stored in a different bank 221 in the next lower level cache, e.g., L3 cache 105, than the bank 221 in the next lower level cache, e.g., L3 cache 105, storing the requested information to be written to the next higher level cache, e.g., L2 cache 104. In one embodiment, the bits of bank selector in field 215 may be combined with the four bits in field 226 by using the XOR function. In certain cases in which there is beneficial correlation resulting in a zero percent chance of a resource collision, the XOR embodiment may result in facilitating a resource collision. In another embodiment, the bits of bank selector in field 215 may be combined with the four bits in field 226 by adding the bits of bank selector 215 with the four bits in field 226 and then discarding the carry bit. It is noted that this embodiment has an advantage over the embodiment using the XOR function since it may not facilitate a resource collision in cases where there is a zero percent chance of a resource collision. The following is an example of using the embodiment that adds the bits of bank selector 215 with the four bits in field 226 and then discarding the carry bit.

Suppose the bits of the bank selector in field 215 in address 201 associated with the requested information to be written to the next higher level cache, e.g., L2 cache 104, are 0101 and the four bits in field 226 in address 201 associated with the requested information to be written to the next higher level cache, e.g., L2 cache 104, are 0001. As stated above, one hash of combining the bits of the bank selector in field 215 with the bits in field 226 in address 201 may be adding the bits of the bank selector in field 215 with the bits in field 226 and then discarding the carry bit. The hash of combining the bits of the bank selector in field 215, e.g., 0101, with the bits in field 226, e.g., 0001, and then discarding the carry bit yields the result of 0110 which corresponds to the $6^{th}$ bank 221, e.g., bank 221F. The bits of the bank selector in field 215 in address 201 associated with the modified information are the same as the bits of the bank selector in field 215 in address 201 associated with the requested information to be written to the next higher level cache, e.g., L2 cache 104, since address 201 associated with the modified information has the same row selector bits in field 212 as address 201 associated with the requested information. If the four bits in field 226 of address 201 associated with the modified information differ from the four bits in field 226 of address 201 associated with the requested information, then the modified information is stored in a different bank 221 than the bank 221 storing the requested information to be written to the next higher level cache, e.g., L2 cache 104. For example, suppose the four bits in field 226 of address 201 associated with the modified information are 0101. By using the hash of combining the bits of the bank selector in field 215, e.g., 0101, with the four bits in field 226, e.g., 0101, and then discarding the carry bit, the hash yields the result of 1010 which corresponds to the $10^{th}$ bank 221, e.g., bank 221J. Thus, the modified information is stored in a different bank 221, e.g., bank 221J, than the bank 221, e.g., bank 221F, storing the requested information to be written to the next higher level cache, e.g., L2 cache 104, when the four bits in field 226 of address 201 associated with the modified information differs from the four bits in field 226 of address 201 associated with the requested information. As stated above, there is a 15 out of 16 probability that the four bits in field 226 of address 201 associated with the modified information differs from the four bits in field 226 of address 201 associated with the requested information. Thus, there is a 15 out of 16 probability that the modified information will be stored in a different bank 221, e.g., bank 221J, than the bank 221, e.g., bank 221F, storing the requested information to be written to the next higher level cache, e.g., L2 cache 104.

Figure 3:
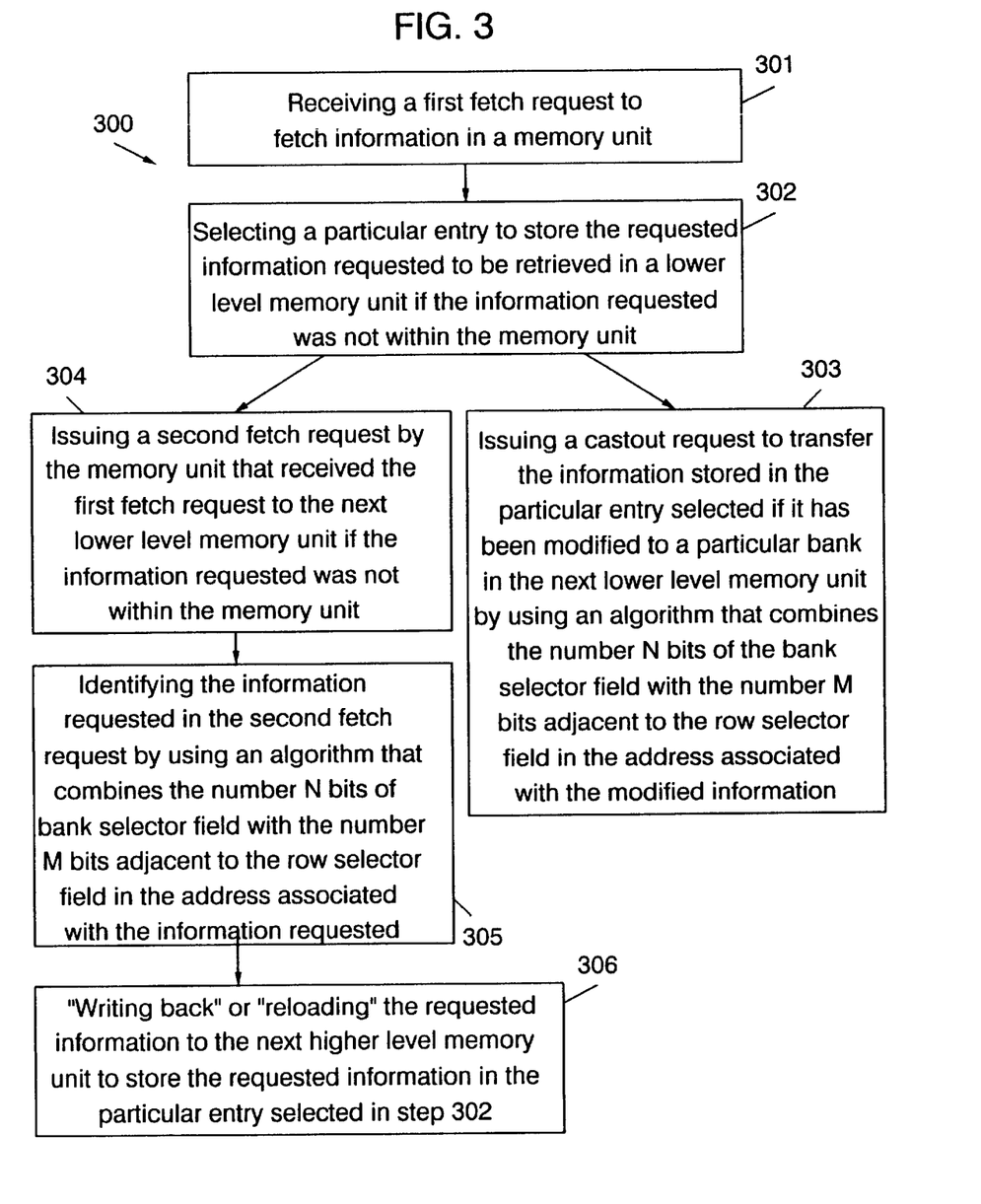
FIG. 3 is a flowchart of a method for reducing resource collisions associated with memory units in the case of at least one fetch operation and at least one castout operation.

FIG. 3—Method for Reducing Resource Collisions Associated with Memory Units in the Case of at Least One Fetch Operation and at Least One Castout Operation FIG. 3 illustrates a flowchart of one embodiment of the present invention of a method 300 for reducing resource collisions associated with memory units, e.g., caches, in a multi-level hierarchy memory system when at least one fetch operation and at least one castout operation retrieve and store information, respectively, in the same bank in a memory unit, e.g., cache.

In step 301, a memory unit, e.g., cache, may be configured to receive a fetch operation, i.e., fetch request, from another memory unit, e.g., processor, cache, to fetch information, instruction, data, from that memory unit, e.g., cache. The fetch operation, i.e., fetch request, may have been issued by processor 101 or a memory unit, e.g., L1 instruction cache 102, L1 data cache 103, L2 cache 104. In the fetch request, processor 101 or a memory unit, e.g., L1 instruction cache 102, L1 data cache 103, L2 cache 104, may send an address, e.g., address 201, of the requested information to the respective memory unit, e.g., cache. As stated above, the address, e.g., address 201, may comprise a row selector, e.g., field 212, that selects a particular row within the memory unit, e.g., cache, to fetch the information, e.g., instruction, data.

In step 302, if the information is not present within the selected row of the memory unit, e.g., L2 cache 104, receiving the fetch request, then the memory unit, e.g., L2 cache 104, receiving the fetch request, may comprise logic that selects a particular entry, e.g., cache line, within the row selected, e.g., row 231, to store the requested information that may be retrieved in a lower level memory unit, e.g., L3 cache 105.

In step 303, the memory unit, e.g., L2 cache 104, may issue what is commonly referred to as a castout operation, i.e., castout request, if the particular entry, e.g., cache line, selected by the memory unit, e.g., L2 cache 104, has recently been modified. In a castout request, the modified information stored in the entry, e.g., cache line, of the memory unit, e.g., L2 cache 104, may be transferred to a particular bank, e.g., bank 221J, in the next lower memory level, e.g., L3 cache 105. The particular bank, e.g., bank 221J, in the next lower memory level, e.g., L3 cache 105, may be selected by a hash that combines the number N bits, e.g., four bits, defining the bank selector in field 215 with the number M bits, e.g., four bits, in field 226 located adjacent to a region of correlation, e.g., field 212, in address 201 associated with the modified information. In one embodiment, the number N bits of bank selector in field 215 may be combined with the number M bits in field 226 by using the XOR function. In another embodiment, the number N bits of bank selector in field 215 may be combined with the number M bits in field 226 by adding the number N bits of bank selector 215 with the number M bits in field 226 and then discarding the carry bit.

In step 304, the memory unit, e.g., L2 cache 104, receiving the fetch request, may comprise logic to issue a fetch request almost concurrently with the castout request to fetch the information, e.g., instruction, data, in the next lower memory level, e.g., L3 cache 105, if the requested information, e.g., instruction, data, was not present within the selected row of the memory, e.g., L2 cache 104, receiving the fetch request. In the fetch request, the memory unit, e.g., L2 cache 104, sends the same address, e.g., address 201, received to the next lower memory level, e.g., L3 cache 105.

In step 305, the next lower memory level, e.g., L3 cache 105, may identify the information, e.g., instruction, data, requested in the fetch request within a particular bank selected, e.g., bank 221F, by fields 215 and 226 in address 201, in the next lower memory level, e.g., L3 cache 105. The particular bank 221, e.g., bank 221F, storing the requested information, e.g., instruction, data, may be selected by using the same hash as described in step 303 that combines the number N bits, e.g., four bits, defining the bank selector in field 215 with the number M bits, e.g., four bits, in field 226 located adjacent to a region of correlation, e.g., field 212, in address 201. That is, the hash combines the number N bits defining the bank selector in field 215 with the number M bits in field 226 located adjacent to a region of correlation, e.g., field 212, in address 201 associated with the requested information, e.g., instruction, data. When both numbers N and M equal four, there is a 15 out of 16 probability that the four bits in field 226 in address 201 associated with the requested information are not correlated, i.e., different, than the four bits in field 226 in address 201 associated with the modified information, e.g., instruction, data. Subsequently, there is a 15 out of 16 probability that the requested information, e.g., instruction, data, to be written to the next higher memory level, e.g., L2 cache 104, is stored in a different bank, e.g., bank 221F, in the next lower memory level, e.g., L3 cache 105, than the bank, e.g., bank 221J, in the next lower memory level, e.g., L3 cache 105 that receives the modified information from the next higher memory level, e.g., L2 cache 104. In one embodiment, the number N bits of bank selector in field 215 may be combined with the number M bits in field 226 by using the XOR function. In another embodiment, the number N bits of bank selector in field 215 may be combined with the number M bits in field 226 by adding the number N bits of bank selector 215 with the number M bits in field 226 and then discarding the carry bit.

In step 306, the next lower memory level, e.g., L3 cache 105, may comprise logic to "write back" or "reload" the requested information, e.g., instruction, data, to the next higher memory level, e.g., L2 cache 104.

It is noted that steps 301–306 in method 300 may be executed in a different order than presented and that the order presented in the discussion of FIG. 3 is illustrative. It is further noted that certain steps in steps 301–306, e.g., steps 303 and 304, may be executed almost concurrently.

Although the system and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for reducing resource collisions associated with address flows through hierarchial memory units comprising the steps of:
   receiving a first operation by a first memory unit, wherein said first operation is a first request to access information identified by a first address;
   issuing a second operation by said first memory unit to a second memory unit of the hierarchy based upon the first address; and
   identifying said information identified by said first address in said second memory unit by a hash of the first address which combines a first number N bits and a second number M bits in said first address.

2. The method as recited in claim 1, wherein said second number M bits is located adjacent to bits that define a region of correlation in said first address.

3. The method as recited in claim 1, wherein said hash combines said first number N bits and said second number M bits using an XOR function.

4. The method as recited in claim 1, wherein said hash combines said first number N bits and said second number M bits by adding said first number N bits with said second number M bits and discarding a carry bit.

5. The method as recited in claim 1 further comprising the step of:
   writing back said information identified by said first address to said first memory unit by said second memory unit.

6. The method as recited in claim 1 further comprising the step of:
 selecting a particular entry in said first memory unit to store said information identified by said first address using said first address.

7. The method as recited in claim 6 further comprising the step of:
 issuing a third operation by said first memory unit to said second memory unit to store information in said particular entry selected in said first memory unit if said information in said particular entry has been modified.

8. The method as recited in claim 7, wherein said third operation and said second operation are issued by said first memory unit almost concurrently.

9. The method as recited in claim 7, wherein said information stored in said second memory is stored in a first bank in said second memory, wherein said information in said particular entry in said first memory is identified by a second address, wherein said information in said particular entry in said first memory is stored in a second bank in said second memory unit using said hash, wherein said hash combines said first number N bits in said second address in said second memory unit with said second number M bits in said second address.

10. The method as recited in claim 9, wherein if a value of said second number M bits in said first address differs from a value of said second number M bits in said second address then said first bank differs from said second bank.

11. A system comprising:
 a first memory unit configured to receive a first operation, wherein said first operation is a first request to access information identified by a first address; and
 a second memory unit coupled to said first memory unit, wherein said second memory unit is configured to receive a second operation issued by said first memory unit based upon the first address;
 wherein said information identified by said first address stored in said second memory unit by a hash that combines a first number N bits and a second number M bits in said first address.

12. The system as recited in claim 11, wherein said second number M bits is located adjacent to bits that define a region of correlation in said first address.

13. The system as recited in claim 11, wherein said hash combines said first number N bits and said second number M bits using an XOR function.

14. The system as recited in claim 11, wherein said hash combines said first number N bits and said second number M bits by adding said first number N bits with said second number M bits and discarding a carry bit.

15. The system as recited in claim 11, wherein said second memory unit writes back said information identified by said first address to said first memory unit by said second memory unit.

16. The system as recited in claim 11, wherein said first memory unit is configured to select a particular entry in said first memory unit to store said information identified by said first address using said first address.

17. The system as recited in claim 16, wherein said first memory unit issues a third operation to said second memory unit to store information in said particular entry selected in said first memory unit if said information in said particular entry has been modified.

18. The system as recited in claim 17, wherein said third operation and said second operation are issued by said first memory unit almost concurrently.

19. The system as recited in claim 17, wherein said information stored in said second memory is stored in a first bank in said second memory, wherein said information in said particular entry in said first memory is identified by a second address, wherein said information in said particular entry in said first memory is stored in a second bank in said second memory unit using said hash, wherein said hash combines said first number N bits in said second address in said second memory unit with said second number M bits in said second address.

20. The system as recited in claim 19, wherein if a value of said second number M bits in said first address differs from a value of said second number M bits in said second address then said first bank differs from said second bank.

21. A data processing system, comprising:
 a processor;
 a first memory unit coupled to said processor, wherein said first memory unit is configured to receive a first operation, wherein said first operation is a first request to access information identified by a first address; and
 a second memory unit coupled to said first memory unit, wherein said second memory unit is configured to receive a second operation issued by said first memory unit based upon the first address;
 a system memory for storing instructions of said processor;
 a bus system coupling said processor to said system memory;
 wherein said information identified by said first address is stored in said second memory unit by a hash that combines a first number N bits and a second number M bits in said first address.

22. The data processing system as recited in claim 21, wherein said second number M bits is located adjacent to bits that define a region of correlation in said first address.

23. The data processing system as recited in claim 21, wherein said hash combines said first number N bits and said second number M bits using an XOR function.

24. The data processing system as recited in claim 21, wherein said hash combines said first number N bits and said second number M bits by adding said first number N bits with said second number M bits and discarding a carry bit.

25. The data processing system as recited in claim 21, wherein said second memory unit writes back said information identified by said first address to said first memory unit by said second memory unit.

26. The data processing system as recited in claim 21, wherein said first memory unit is configured to select a particular entry in said first memory unit to store said information identified by said first address using said first address.

27. The data processing system as recited in claim 26, wherein said first memory unit issues a third operation to said second memory unit to store information in said particular entry selected in said second memory unit if said information in said particular entry has been modified.

28. The data processing system as recited in claim 27, wherein said third operation and said second operation are issued by said first memory unit almost concurrently.

29. The data processing system as recited in claim 27, wherein said information stored in said second memory is stored in a first bank in said second memory, wherein said information in said particular entry in said first memory is identified by a second address, wherein said information in said particular entry in said first memory is stored in a second bank in said second memory unit using said hash, wherein said hash combines said first number N bits in said second address in said second memory unit with said second number M bits in said second address.

30. The data processing system as recited in claim 29, wherein if a value of said second number M bits in said first address differs from a value of said second number M bits in said second address then said first bank differs from said second bank.

* * * * *

UNITED STATES PATENT AND TRADEMARK OFFICE
CERTIFICATE OF CORRECTION

PATENT NO. : 6,493,814 B2
DATED : December 10, 2002
INVENTOR(S) : James Stephen Fields, Jr. et al.

It is certified that error appears in the above-identified patent and that said Letters Patent is hereby corrected as shown below:

<u>Title page,</u>
Item [74], please replace *Attorney* "Voight" with -- Voigt --.

Signed and Sealed this

Twelfth Day of August, 2003

JAMES E. ROGAN
*Director of the United States Patent and Trademark Office*